(12) United States Patent
Asuke et al.

(10) Patent No.: US 7,915,875 B2
(45) Date of Patent: Mar. 29, 2011

(54) CURRENT-MODE CONTROLLED DC-DC CONVERTER

(75) Inventors: Hideki Asuke, Niiza (JP); Hideharu Takano, Niiza (JP); Masaki Kanazawa, Niiza (JP); Mamoru Tsuruya, Niiza (JP); Masayoshi Yamamoto, Matsue (JP); Hiroyuki Horii, Matsue (JP); Shigeyuki Funabiki, Matsue (JP)

(73) Assignees: Sanken Electric Co., Ltd., Niiza-shi (JP); Shimane University, Matsue-shi (JP)

( * ) Notice: Subject to any disclaimer, the term of this patent is extended or adjusted under 35 U.S.C. 154(b) by 326 days.

(21) Appl. No.: 12/250,839

(22) Filed: Oct. 14, 2008

(65) Prior Publication Data

US 2009/0262555 A1    Oct. 22, 2009

(30) Foreign Application Priority Data

Apr. 16, 2008    (JP) ................................. 2008-107207

(51) Int. Cl.
   *G05F 1/24*    (2006.01)
   *G05F 1/40*    (2006.01)
(52) U.S. Cl. ......... 323/259; 323/261; 323/272; 323/285
(58) Field of Classification Search .................. 323/225, 323/259, 261, 262, 272, 285
See application file for complete search history.

(56) References Cited

U.S. PATENT DOCUMENTS

| | | | | |
|---|---|---|---|---|
| 7,116,087 B2 * | 10/2006 | Zhang et al. | ................... | 323/272 |
| 7,138,787 B2 * | 11/2006 | Tsuruya | ........................ | 323/225 |
| 7,276,884 B2 * | 10/2007 | Tsuruya | ........................ | 323/261 |
| 7,466,110 B2 * | 12/2008 | Tsuruya | ........................ | 323/207 |
| 2006/0208713 A1 | 9/2006 | Tsuruya | | |

OTHER PUBLICATIONS

U.S. Appl. No. 12/179,036, Filed Jul. 24, 2008, Asuke, et al.
U.S. Appl. No. 12/250,843, filed Oct. 14, 2008, Asuke, et al.

* cited by examiner

*Primary Examiner* — Jessica Han
(74) *Attorney, Agent, or Firm* — Oblon, Spivak, McClelland, Maier & Neustadt, L.L.P.

(57) ABSTRACT

A current-mode controlled DC-DC converter includes a comparator comparing a first or second current detection signal with a first or second reference current that is based on an error voltage of a voltage detection signal, a pulse generator generating a first pulse signal whose ON time is longer than an interval between when the second current detection signal reaches a minimum value and when the second current detection signal reaches the second reference current, a pulse generator generating a second pulse signal whose ON time is longer than an interval between when the first current detection signal reaches a minimum value and when the first current detection signal reaches the first reference current, the second pulse signal being behind the first pulse signal by a half period, and a PWM circuit generating a first or second PWM signal according to the pulse signal and an output signal from the comparator, thereby turning on/off a switch.

4 Claims, 4 Drawing Sheets

CURRENT-MODE CONTROLLED DC-DC CONVERTER

BACKGROUND OF THE INVENTION

1. Field of the Invention

The present invention relates to a current-mode controlled DC-DC converter with a step-up chopper circuit employing peak-current-mode control, and particularly, to a current-mode controlled DC-DC converter for an electric vehicle.

2. Description of the Related Art

FIG. 1 is a circuit diagram illustrating a DC-DC converter according to a related art. This DC-DC converter is a step-up DC-DC converter including a DC power source Vdc1, transformers T3 and T4, a reactor L3, switches Q1 and Q2, diodes D3 and D4, a smoothing capacitor C1, and a control circuit 100.

The transformer T3 has a primary winding 5a (whose number of turns being np), a winding 5b (whose number of turns being np1) connected in series with the primary winding 5a, and a secondary winding 5c (whose number of turns being ns) electromagnetically coupled with the windings 5a and 5b. The transformer T4 is constituted like the transformer T3 and includes a primary winding 6a (whose number of turns being np), a winding 6b (whose number of turns being np1) connected in series with the primary winding 6a, and a secondary winding 6c (whose number of turns being ns) electromagnetically coupled with the windings 6a and 6b.

Ends of the DC power source Vdc1 are connected to the drain and source of the switch Q1 through the primary winding 5a of the transformer T3. The switch Q1 may be a MOSFET. The ends of the DC power source Vdc1 are also connected to the drain and source of the switch Q2 through the primary winding 6a of the transformer T4. The switch Q2 may be a MOSFET. The winding 5b of the transformer T3, the diode D3, and the smoothing capacitor C1 form a first series circuit. One end of the first series circuit is connected to a connection point between the primary winding 5a of the transformer T3 and the drain of the switch Q1, and the other end of the first series circuit is connected to the source of the switch Q1. The winding 6b of the transformer T4, the diode D4, and the smoothing capacitor C1 form a second series circuit. One end of the second series circuit is connected to a connection point between the primary winding 6a of the transformer T4 and the drain of the switch Q2, and the other end of the second series circuit is connected to the source of the switch Q2.

Ends of a series circuit that includes the secondary winding 5c of the transformer T3 and the secondary winding 6c of the transformer T4 are connected to the reactor L3. According to an output voltage Vo from the smoothing capacitor C1, the control circuit 100 turns on/off the switches Q1 and Q2 with a phase difference of 180 degrees.

Operation of the DC-DC converter according to the related art illustrated in FIG. 1 will be explained. The control circuit 100 outputs a control signal Q1g to turn on the switch Q1 and pass a current through a path extending along a positive electrode of Vdc1, 5a, Q1, and a negative electrode of Vdc1. As a result, a current Q1i of the switch Q1 linearly increases. At this time, the secondary winding 5c of the transformer T3 generates a voltage to pass a current L3i through a path extending along 5c, L3, 6c, and 5c.

The current L3i passes according to the low of equal ampere-turns, to accumulate energy in the reactor L3 and pass the same current through the secondary winding 6c of the transformer T4. As a result, the primary winding 6a and winding 6b of the transformer T4 induce voltages proportional to the numbers of turns thereof.

In a case where the transformer T4 has a turn ratio A as expressed by a relationship of A=(np+np1)/np, a current of Q1i/A (Q1i being the current of switch Q1) passes through the diode D4 through a path extending along the positive electrode of Vdc1, 6a, 6b, D4, C1, and the negative electrode of Vdc1. The current D4i of the diode D4 passes until when the switch Q2 turns on. The output voltage Vo of the smoothing capacitor C1 is the sum of a voltage (input voltage) of the DC power source Vdc1, a voltage generated by the primary winding 6a of the transformer T4, and a voltage generated by the winding 6b of the transformer T4.

A voltage generated by the transformer T4 is expressed by a relationship of A·Vdc1·D, where D is an ON duty of the switch Q1(D=Ton/T), Ton is an ON time of the switch Q1, and T is a switching period of the switch Q1. The output voltage Vo of the smoothing capacitor C1 is expressed as follows:

$$Vo=Vdc1(1+A \cdot D)$$

Namely, the output voltage Vo is controllable by changing the ON duty D.

Thereafter, the control circuit 100 turns off the switch Q1 with the control signal Q1g, to pass a current D3i through a path extending along the positive electrode of Vdc1, 5a, 5b, D3, C1, and the negative electrode of Vdc1.

Then, the control circuit 100 provides a control signal Q2g to turn on the switch Q2 and pass a current through a path extending along the positive electrode of Vdc1, 6a, Q2, and the negative electrode of Vdc1. As a result, a current Q2i of the switch Q2 linearly increases. At this time, the secondary winding 6c of the transformer T4 generates a voltage to increasingly pass a current L3i through a path extending along 6c, 5c, L3, and 6c.

The current L3i passes according to the low of equal ampere-turns, to accumulate energy in the reactor L3 and pass the same current through the secondary winding 5c of the transformer T3. As a result, the primary winding 5a and winding 5b of the transformer T3 induce voltages proportional to the numbers of turns thereof.

In a case where the transformer T3 has a turn ratio A as expressed by a relationship of A=(np+np1)/np, a current of Q2i/A (Q2i being the current of switch Q2) passes through the diode D3 and through a path extending along the positive electrode of Vdc1, 5a, 5b, D3, C1, and the negative electrode of Vdc1. The current D3i of the diode D3 passes until when the switch Q1 turns on. The output voltage Vo of the smoothing capacitor C1 is the sum of a voltage (input voltage) of the DC power source Vdc1, a voltage generated by the primary winding 5a of the transformer T3, and a voltage generated by the winding 5b of the transformer T3.

In this way, the multiphase, transformer-linked, step-up chopper circuit illustrated in FIG. 1 couples two independent phases with each other through the transformers. This configuration can perform a step-up operation with a single core instead of dual cores.

Another related art is Mark Hartman, "Design of current-mode controlled DC-DC converter," Transistor Gijutsu, April 2004, pp. 213-222, CQ Publishing Co., Ltd. This related art achieves peak-current-mode control that turns on a switch, detects a current passing through a step-up reactor, and turns off the switch if a voltage corresponding to the detected current is equal to a control voltage. Namely, this related art restricts a peak value of a current signal detected from a step-up chopper circuit, thereby controlling the current passing therethrough.

SUMMARY OF THE INVENTION

The DC-DC converter illustrated in FIG. 1 turns on/off the switch Q1 for a first phase and the switch Q2 for a second phase with a phase difference of 180 degrees and links the energy accumulating elements of the two phases with each other through the transformers. According to this configuration, a current of one of the phases directly influences a current of the other phase. Namely, the switch or a control system of one of the phases reacts to a peak current produced by the switch of the other phase, to cause a malfunction of the DC-DC converter.

According to the present invention, a current-mode controlled DC-DC converter capable of making a control system or a switch of one phase unresponsive to a peak current produced by a switch of the other phase can be provided.

According to an aspect of the present invention, provided is a current-mode controlled DC-DC converter including a first switch connected to ends of a DC power source through a primary winding of a first transformer; a second switch connected to the ends of the DC power source through a primary winding of a second transformer; a first series circuit including a first diode and a smoothing capacitor, one end of the first series circuit being connected to a connection point between the primary winding of the first transformer and a first end of the first switch, the other end of the first series circuit being connected to a second end of the first switch; a second series circuit including a second diode and the smoothing capacitor, one end of the second series circuit being connected to a connection point between the primary winding of the second transformer and a first end of the second switch, the other end of the second series circuit being connected to a second end of the second switch; a reactor connected to ends of a series circuit that includes a secondary winding of the first transformer and a secondary winding of the second transformer; a first current detector configured to detect a current passing through the primary winding of the first transformer; a second current detector configured to detect a current passed to the primary winding of the second transformer; a voltage detector configured to detect an output voltage of the smoothing capacitor; a first comparator configured to compare a first current detection signal from the first current detector with a first reference current that is based on an error voltage between a voltage detection signal from the voltage detector and a reference voltage; a second comparator configured to compare a second current detection signal from the second current detector with a second reference current that is based on the error voltage between the voltage detection signal from the voltage detector and the reference voltage; a first pulse generator configured to generate a first pulse signal whose ON time is longer than an interval between when the second current detection signal reaches a minimum value and when the second current detection signal reaches the second reference current; a second pulse generator configured to generate a second pulse signal whose ON time is longer than an interval between when the first current detection signal reaches a minimum value and when the first current detection signal reaches the first reference current, the second pulse signal being behind the first pulse signal by a half period; a first PWM circuit configured to generate a first PWM signal according to the first pulse signal from the first pulse generator and an output signal from the first comparator, the first PWM signal turning on/off the first switch; and a second PWM circuit configured to generate a second PWM signal according to the second pulse signal from the second pulse generator and an output signal from the second comparator, the second PWM signal turning on/off the second switch.

According to a second aspect of the present invention, an ON time of the second PWM signal partly overlaps an ON time of the first PWM signal.

According to a third aspect of the present invention, an ON time of each of the first and second pulse signals is in the range of 40% to 60% of a period of the same signal.

DESCRIPTION OF THE PREFERRED EMBODIMENT

A current-mode controlled DC-DC converter according to an embodiment of the present invention will be explained in detail with reference to the drawings.

Figure 3:
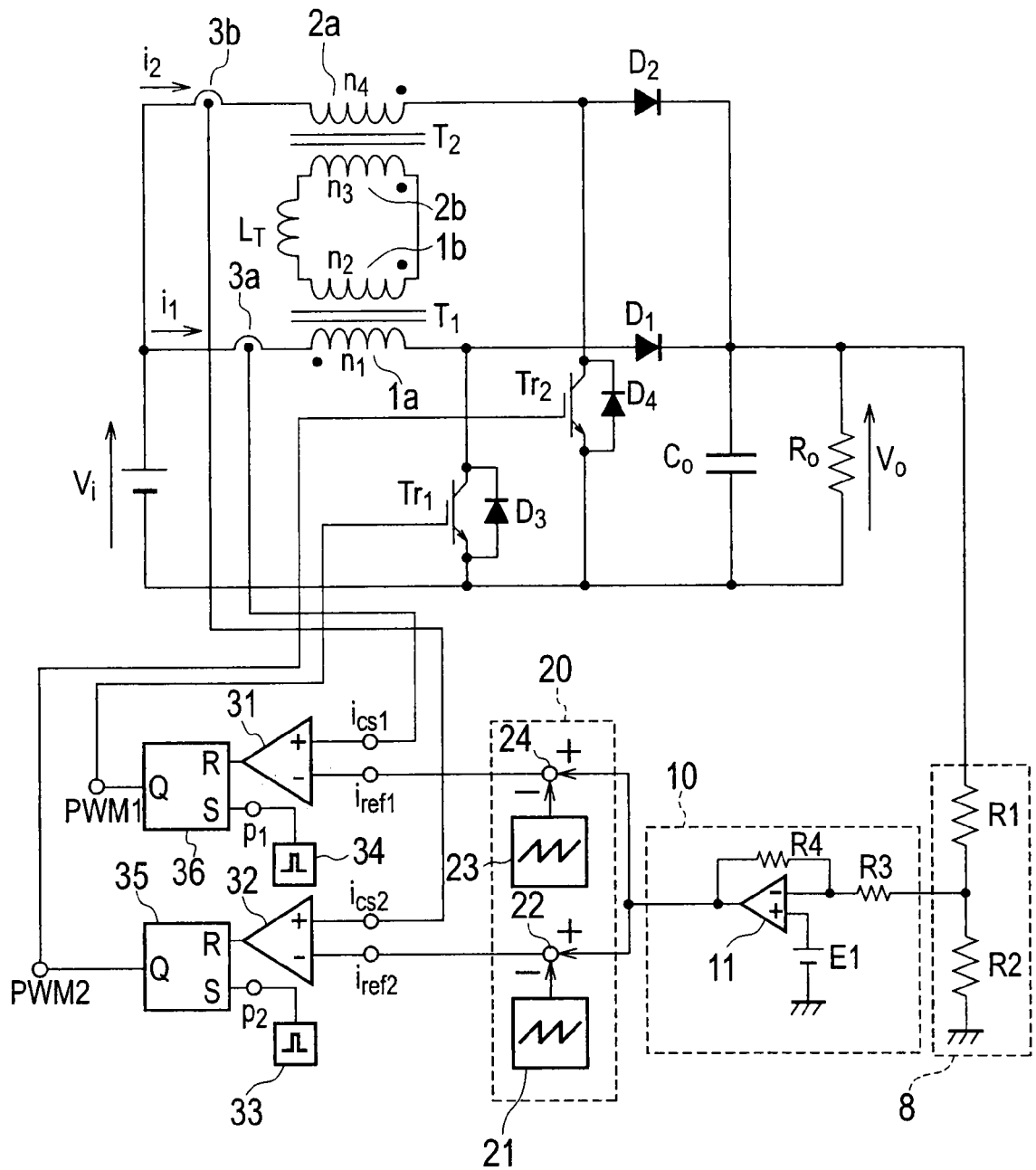
FIG. 3 is a circuit diagram illustrating a current-mode controlled DC-DC converter according to an embodiment of the present invention.

FIG. 3 is a circuit diagram illustrating the current-mode controlled DC-DC converter according to an embodiment of the present invention. This converter employs a peak-current-mode, multiphase, transformer-linked, step-up chopper circuit.

The converter in FIG. 3 includes a DC power source V1, transformers T1 and T2, a reactor LT, switches Tr1 and Tr2, diodes D1 and D2, a smoothing capacitor Co, current detectors 3a and 3b, a voltage detector 8, an error amplification circuit 10, a slope compensation circuit 20, comparators 31 and 32, pulse generators 33 and 34, and flip-flop circuits 35 and 36. The error amplification circuit 10, slope compensation circuit 20, comparators 31 and 32, pulse generators 33 and 34, and flip-flop circuits 35 and 36 constitute a control circuit.

The transformer T1 includes a primary winding 1a (whose number of turns being n1) and a secondary winding 1b (whose number of turns being n2) electromagnetically coupled with the primary winding 1a. The transformer T2 is constituted like the transformer T1 and includes a primary winding 2a (whose number of turns being n4) and a secondary winding 2b (whose number of turns being n3) electromagnetically coupled with the primary winding 2a.

Ends of the DC power source Vi are connected to the collector and emitter of the switch Tr1 through the current detector 3a and the primary winding 1a of the transformer T1. The switch Tr1 is an IGBT (insulated gate bipolar transistor). The ends of the DC power source Vi are also connected to the collector and emitter of the switch Tr2 through the current detector 3b and the primary winding 2a of the transformer T2. The switch Tr2 is an IGBT. The current detectors 3a and 3b are, for example, current transformers, respectively.

The diode D1 and smoothing capacitor Co form a first series circuit. One end of the first series circuit is connected to a connection point between the primary winding 1a of the transformer T1 and the collector of the switch Tr1, and the other end of the first series circuit is connected to the emitter of the switch Tr1. The diode D2 and smoothing capacitor Co form a second series circuit. One end of the second series circuit is connected to a connection point between the primary winding 2a of the transformer T2 and the collector of the switch Tr2, and the other end of the second series circuit is connected to the emitter of the switch Tr2. The reactor $L_T$ is connected to ends of a series circuit that consists of the secondary winding 1b of the transformer T1 and the secondary winding 2b of the transformer T2.

The voltage detector 8 has resistors R1 and R2 connected in series, to detect an output voltage Vo of the smoothing capacitor Co and provide the error amplification circuit 10 with a voltage detection signal. The error amplification circuit 10 has resistors R3 and R4, a reference voltage E1, and an error amplifier 11, to amplify an error voltage between the voltage detection signal from the voltage detector 8 and the reference voltage E1 and provide adders 22 and 24 with the amplified error voltage.

The slope compensation circuit 20 has triangular wave generators 21 and 23 and the adders 22 and 24, to compensate the output from the error amplification circuit 10 by adding a negative linear inclination thereto so that a current waveform may not cause a sub harmonic oscillation even when a switch ON ratio exceeds 50%.

The triangular wave generator 21 generates a triangular wave signal. The triangular wave generator 23 generates a triangular wave signal that is shifted by a half period from the triangular wave signal generated by the triangular wave generator 21.

The adder 22 subtracts a voltage of the triangular wave signal generated by the triangular wave generator 21 from the error voltage provided by the error amplification circuit 10 and provides an inverting terminal of the comparator 32 with a current iref2 (second reference current) corresponding to the subtraction result. The adder 24 subtracts a voltage of the triangular wave signal generated by the triangular wave generator 23 from the error voltage provided by the error amplification circuit 10 and provides an inverting terminal of the comparator 31 with a current iref1 (first reference current) corresponding to the subtraction result.

The current detector 3a detects a current passed to the primary winding 1a of the transformer T1 and provides a non-inverting terminal of the comparator 31 with the detected current ics1 (first current detection signal). The current detector 3b detects a current passed to the primary winding 2a of the transformer T2 and provides a non-inverting terminal of the comparator 32 with the detected current ics2 (second current detection signal).

The comparator 31 provides a reset terminal R of the flip-flop circuit 36 with a high-level signal if the detected current ics1 from the current detector 3a is equal to or higher than the current iref1 from the adder 24, and a low-level signal if the detected current ics1 is lower than the current iref1.

The pulse generator 33 generates a pulse signal. The pulse generator 34 generates a pulse signal that is shifted by a half period from the pulse signal generated by the pulse generator 33.

Namely, the pulse generator 34 generates a pulse signal p1 whose ON time is longer than an interval between when the detected current ics2 reaches a minimum value and when the detected current ics2 reaches the current iref2. This ON time of the pulse signal p1 is, for example, 40% of a period of the pulse signal p1. The pulse generator 33 generates a pulse signal p2 whose ON time is longer than an interval between when the detected current ics1 reaches a minimum value and when the detected current ics1 reaches the current iref1. The pulse signal p2 is generated a half period later the generation of the pulse signal p1. The ON time of the pulse signal p2 is, for example, 40% of a period of the pulse signal p2.

The ON time of each of the pulse signals p1 and p2 is allowed to be in the range of 40% to 60% of a period of the same signal.

Based on the pulse signal p1 from the pulse generator 34 and the output signal from the comparator 31, the flip-flop circuit 36 (first PWM circuit) generates a first PWM signal PWM1 to turn on/off the switch Tr1. Based on the pulse signal p2 from the pulse generator 33 and the output from the comparator 32, the flip-flop circuit 35 (second PWM circuit) generates a second PWM signal PWM2 to turn on/off the switch Tr2 with a phase difference of a half period with respect to the turning on/off of the switch Tr1. An ON time of the first PWM signal PWM1 partly overlaps an ON time of the second PWM signal PWM2.

Figure 4:
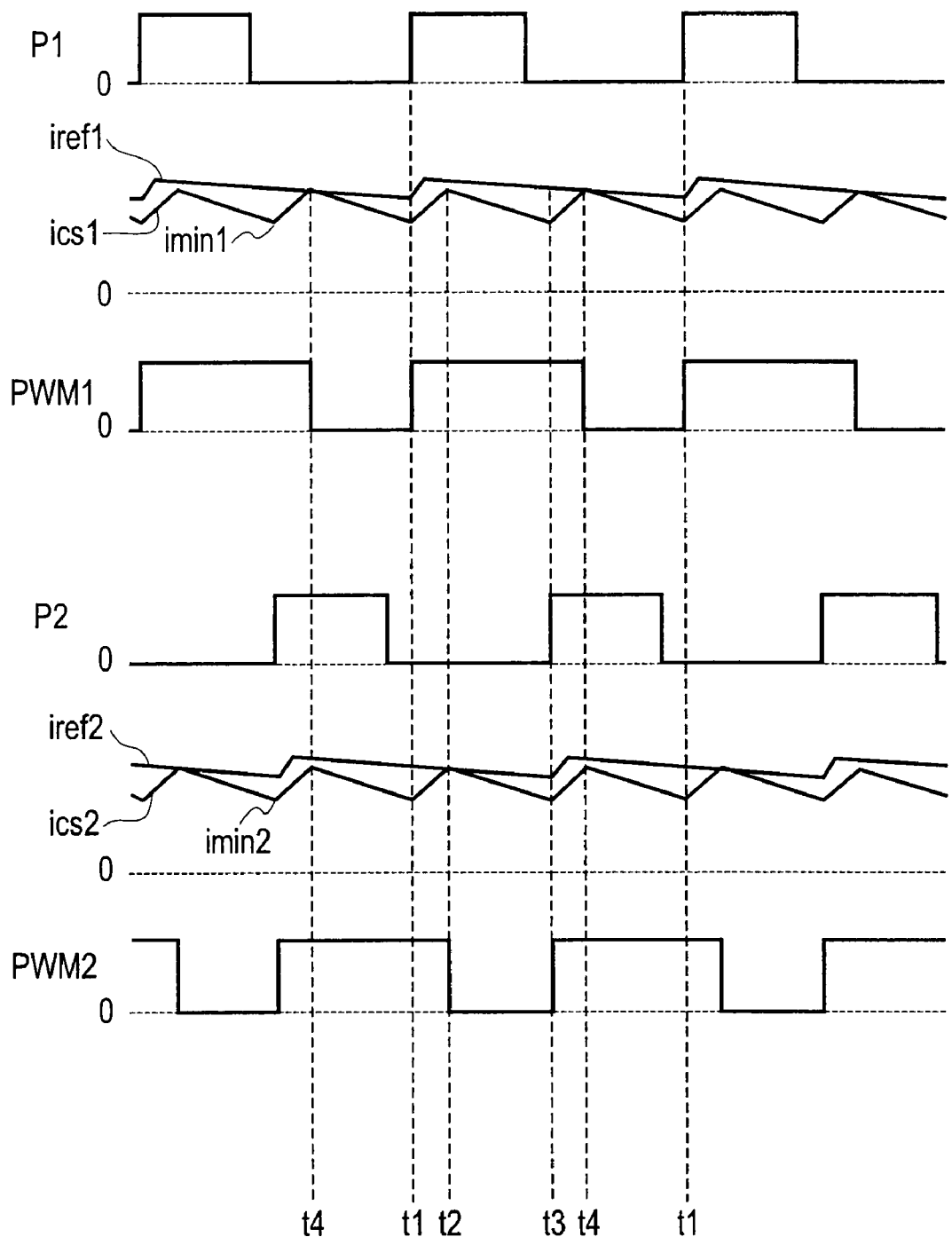
FIG. 4 is a timing chart illustrating signals at various parts of the current-mode controlled DC-DC converter of the embodiment.

Operation of the current-mode controlled DC-DC converter according to the embodiment illustrated in FIG. 3 will be explained in detail with reference to the timing chart of FIG. 4.

Figure 1:
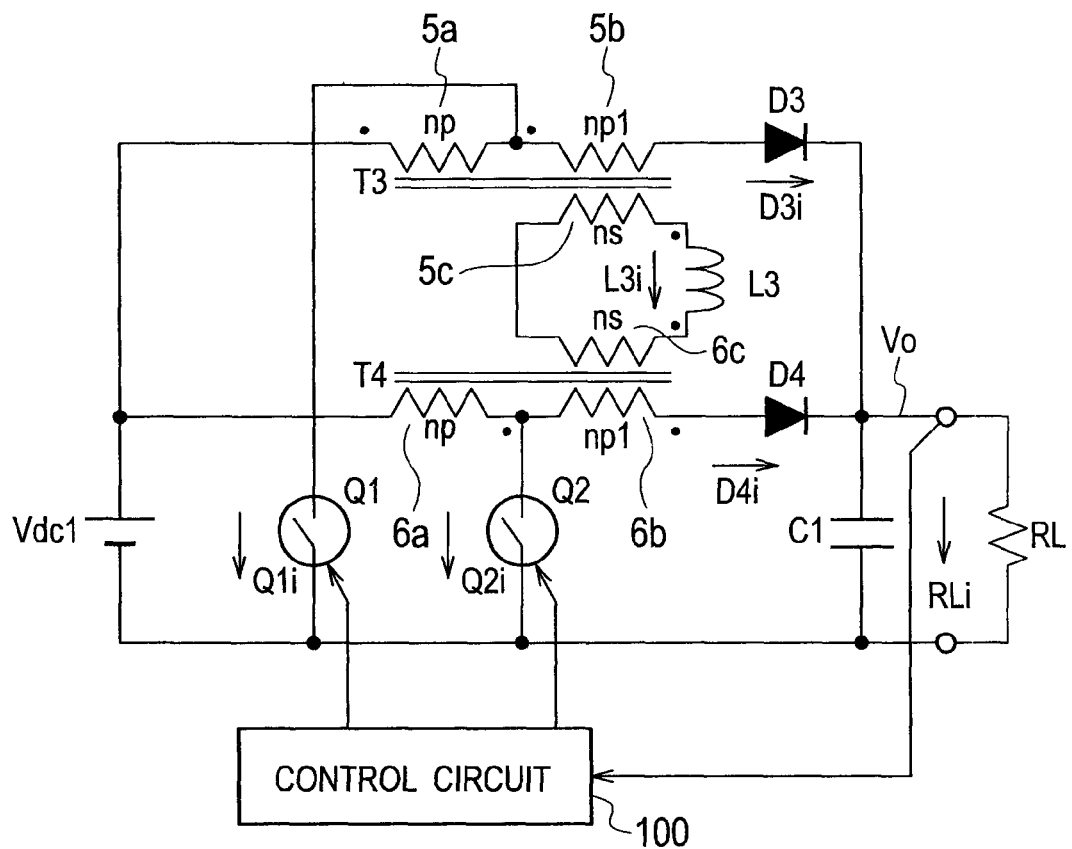
FIG. 1 is a circuit diagram illustrating a DC-DC converter according to a related art.

Operation of the step-up chopper circuit illustrated in FIG. 3 is substantially the same as that of the step-up chopper circuit illustrated in FIG. 1, and therefore, the explanation thereof is omitted. Operation of only the current-mode control of the circuit illustrated in FIG. 3 will be explained.

At time t1, the first-phase pulse signal (set pulse) p1 from the pulse generator 34 rises to high level and the flip-flop circuit 36 outputs the first PWM signal PWM1 to turn on the first-phase switch Tr1. When the switch Tr1 turns on, currents pass through the transformers T1 and T2, and therefore, the detected currents ics1 and ics2 from the current detectors 3a and 3b increase.

At time t2, the second-phase detected current ics2 reaches the second-phase current peak value iref2 that is based on an error voltage and is sent from the adder 22. Then, the comparator 32 outputs a high-level signal to the reset terminal R of the flip-flop circuit 35. The flip-flop circuit 35, therefore, outputs the second PWM signal PWM2 of low level to the second-phase switch Tr2 to turn off the second-phase switch Tr2.

At time t3, the second pulse signal (set pulse) p2 from the pulse generator 33 rises to high level. Then, the flip-flop circuit 35 outputs the second PWM signal PWM2 of high level to turn on the second-phase switch Tr2.

At time t4, the first-phase detected current ics1 reaches the first-phase current peak value iref1 that is based on an error voltage and is sent from the adder 24. Then, the comparator 31 outputs a high-level signal to the reset terminal R of the flip-flop circuit 36. The flip-flop circuit 36, therefore, outputs the first PWM signal PWM1 of low level to the first-phase switch Tr1 to turn off the switch Tr1.

In this way, the current-mode controlled DC-DC converter according to the embodiment includes the pulse generator 34 that generates the pulse signal p1 whose ON time is longer than an interval from the time point t1 when the detected current ics2 reaches a minimum value imin2 to the time point t2 when the detected current ics2 reaches the current iref2 (current peak value). At this time point t2, the switch Tr2 is turned off. At this time, the switch Tr1 is not turned off. Namely, the switch Tr1 is unresponsive to the peak current related to the switch Tr2.

Similarly, the pulse generator 33 generates, a half period after the generation of the pulse signal p1, the pulse signal p2 whose ON time is longer than an interval from the time point t3 at which the detected current ics1 reaches a minimum value imin1 to the time point t4 at which the detected current ics1 reaches the current iref1 (current peak value). At this time point t4, the switch Tr1 is turned off. At this time, the switch Tr2 is not turned off. Namely, the switch Tr2 is unresponsive to the peak current related to the switch Tr1.

Figure 2:
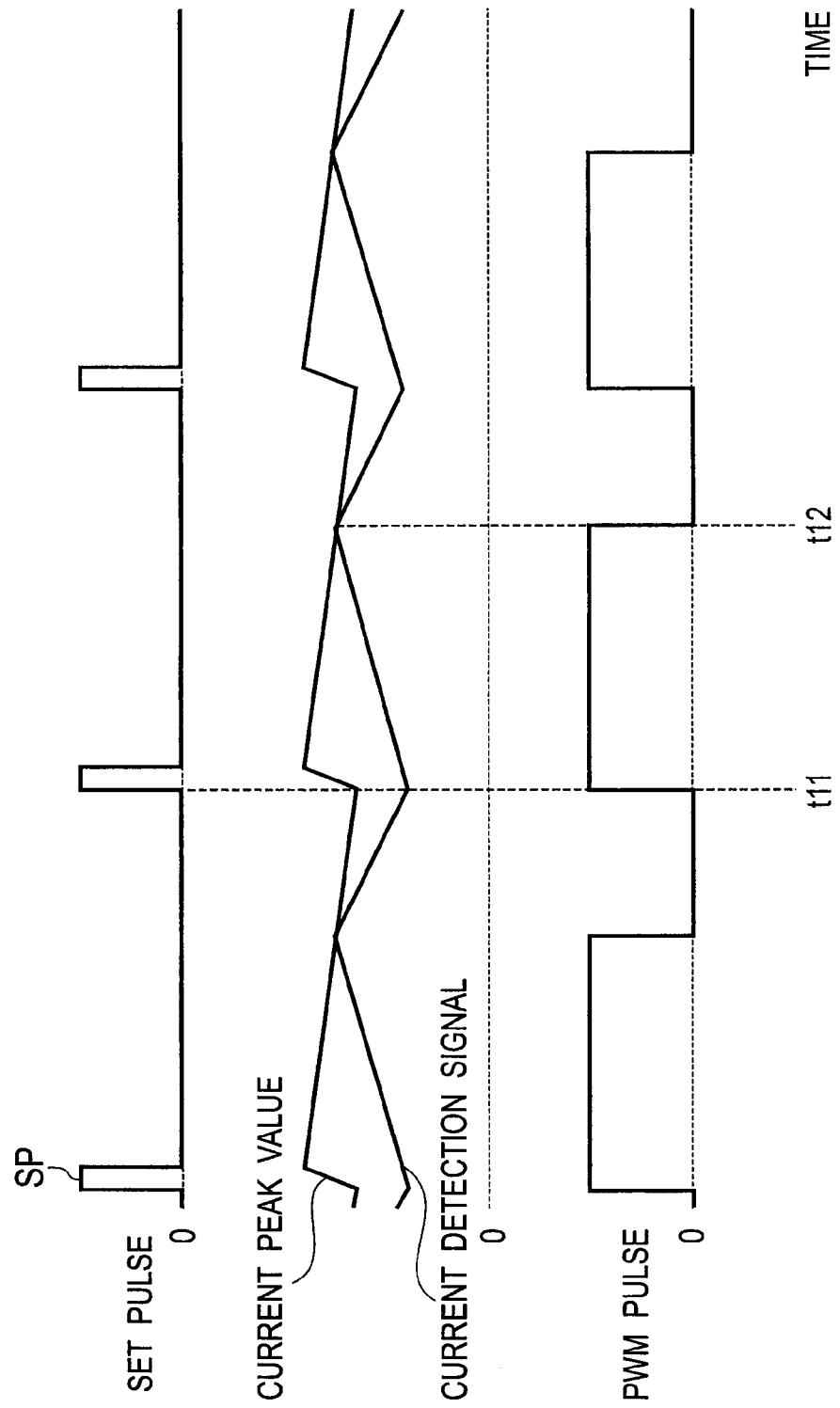
FIG. 2 is a timing chart illustrating signals at various parts of a current-mode controlled DC-DC converter according to a related art.

FIG. 2 is a timing chart illustrating signals at various parts of a current-mode controlled DC-DC converter according to a related art. In FIG. 2, a pulse signal (set pulse) SP generated by, for example, the pulse generator 34 has an ON time that is quite shorter than a period (t11 to t12) from when (t11) a current detection signal reaches a minimum value to when (t12) the current detection signal reaches a current peak value. As a result, when the switch Tr2 turns off at time t12, the switch Tr1 also turns off because the set pulse SP is low at time t12.

On the other hand, the current-mode controlled DC-DC converter of the embodiment illustrated in FIGS. 3 and 4 makes an ON time of a pulse signal (p1, p2) in the range of 40% to 60% of a period (switching period) of the same pulse signal, so that a control system for a first switch of the converter is unresponsive to a peak current related to a second switch that acts a half period later the first switch.

Effect of the present invention will be summarized. The first pulse signal (p1) has an ON time longer than an interval from a time point when the second current detection signal (ics2) reaches a minimum value to a time point when the second current detection signal reaches the second reference current (iref2). The second pulse signal (p2) has an ON time longer than an interval from a time point when the first current detection signal (ics1) reaches a minimum value to a time point when the first current detection signal reaches the first reference current (iref1). With this configuration, the second switch (Tr2) never turns off together with the first switch (Tr1), and the first switch never turns off together with the second switch. Namely, a control system for one switch is unresponsive to a peak current (a reference current based on an error voltage) related to a switching operation of the other switch.

This application claims benefit of priority under 35 USC §119 to Japanese Patent Application No. 2008-107207, filed on Apr. 16, 2008, the entire content of which is incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A current-mode controlled DC-DC converter comprising:
   a first switch connected to ends of a DC power source through a primary winding of a first transformer;
   a second switch connected to the ends of the DC power source through a primary winding of a second transformer;
   a first series circuit including a first diode and a smoothing capacitor, one end of the first series circuit being connected to a connection point between the primary winding of the first transformer and a first end of the first switch, the other end of the first series circuit being connected to a second end of the first switch;
   a second series circuit including a second diode and the smoothing capacitor, one end of the second series circuit being connected to a connection point between the primary winding of the second transformer and a first end of the second switch, the other end of the second series circuit being connected to a second end of the second switch;
   a reactor connected to ends of a series circuit that includes a secondary winding of the first transformer and a secondary winding of the second transformer;
   a first current detector configured to detect a current passing through the primary winding of the first transformer;
   a second current detector configured to detect a current passing through the primary winding of the second transformer;
   a voltage detector configured to detect an output voltage of the smoothing capacitor;
   a first comparator configured to compare a first current detection signal from the first current detector with a first reference current that is based on an error voltage between a voltage detection signal from the voltage detector and a reference voltage;
   a second comparator configured to compare a second current detection signal from the second current detector with a second reference current that is based on the error voltage between the voltage detection signal from the voltage detector and the reference voltage;
   a first pulse generator configured to generate a first pulse signal whose ON time is longer than an interval between when the second current detection signal reaches a minimum value and when the second current detection signal reaches the second reference current;
   a second pulse generator configured to generate a second pulse signal whose ON time is longer than an interval between when the first current detection signal reaches a minimum value and when the first current detection signal reaches the first reference current, the second pulse signal being behind the first pulse signal by a half period;
   a first PWM circuit configured to generate a first PWM signal according to the first pulse signal from the first pulse generator and an output signal from the first comparator, thereby the first switch is turned on/off by the first PWM signal; and
   a second PWM circuit configured to generate a second PWM signal according to the second pulse signal from the second pulse generator and an output signal from the second comparator, thereby the second switch is turned on/off by the second PWM signal.

2. The current-mode controlled DC-DC converter of claim 1, wherein
   an ON time of the second PWM signal partly overlaps an ON time of the first PWM signal.

3. The current-mode controlled DC-DC converter of claim 2, wherein
   an ON time of each of the first and second pulse signals is in the range of 40% to 60% of a period of the same signal.

4. The current-mode controlled DC-DC converter of claim 1, wherein
   an ON time of each of the first and second pulse signals is in the range of 40% to 60% of a period of the same signal.

* * * * *